(12) United States Patent
Ihns

(10) Patent No.: US 9,483,949 B2
(45) Date of Patent: *Nov. 1, 2016

(54) AIRCRAFT AVIONICS MANAGEMENT AND CONTROL SYSTEM

(71) Applicant: Jurgen R. Ihns, Gulf Breeze, FL (US)

(72) Inventor: Jurgen R. Ihns, Gulf Breeze, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/068,810

(22) Filed: Mar. 14, 2016

(65) Prior Publication Data

US 2016/0196752 A1 Jul. 7, 2016

Related U.S. Application Data

(63) Continuation of application No. 14/198,556, filed on Mar. 5, 2014, now Pat. No. 9,293,053.

(60) Provisional application No. 61/773,006, filed on Mar. 5, 2013.

(51) Int. Cl.
| | |
|---|---|
| *G08G 5/00* | (2006.01) |
| *B64D 43/00* | (2006.01) |
| *H04L 7/00* | (2006.01) |
| *G06F 3/0362* | (2013.01) |
| *G06F 3/0488* | (2013.01) |
| *G06F 3/0489* | (2013.01) |
| *G09G 5/00* | (2006.01) |
| *G09G 5/02* | (2006.01) |

(52) U.S. Cl.
CPC ............ *G08G 5/0021* (2013.01); *B64D 43/00* (2013.01); *G06F 3/0362* (2013.01); *G06F 3/04886* (2013.01); *G06F 3/04892* (2013.01); *G08G 5/0017* (2013.01); *G09G 5/006* (2013.01); *G09G 5/02* (2013.01); *H04L 7/0083* (2013.01); *G09G 2370/02* (2013.01); *G09G 2380/12* (2013.01)

(58) Field of Classification Search
CPC . G08G 5/0017; G08G 5/0021; H04L 7/0083
See application file for complete search history.

(56) References Cited

U.S. PATENT DOCUMENTS 3,775,690 A * 11/1973 Ravenelle ................ H04B 1/54
455/158.2
5,708,684 A * 1/1998 Ueda ..................... H04L 7/0083
375/219

(Continued)

*Primary Examiner* — Russell Frejd
(74) *Attorney, Agent, or Firm* — Bryan W. Bockhop; Bockhop Intellectual Property Law, LLC

(57) ABSTRACT

A system for interfacing a user to a plurality of different avionics devices includes a plurality of communications links. Each link is coupled to a different one of the plurality of different avionics devices and adapted to communicate therewith according to a communications protocol associated with the one of the plurality of different avionics devices to which it is coupled. A front panel includes a display device and a plurality of user input components. A processor that is coupled to each of the plurality of communications links, the processor configured to display data from each of the different avionics devices on the display device so that the data from each of the different avionics devices is shown in a different graphical user interface on the display device and so that each graphical user interface conforms to a common display format, the processor further configured to receive user input for a selected one of the avionics devices through at least one of the plurality of user input components and to transmit the user input to the selected one of the avionics devices through one of the plurality of communication links that is coupled to the selected one of the avionics devices.

23 Claims, 9 Drawing Sheets

(56) References Cited

U.S. PATENT DOCUMENTS

| | | | | |
|---|---|---|---|---|
| 6,801,769 B1 * | 10/2004 | Royalty | ................. | B64D 47/00 455/431 |
| 8,326,484 B2 * | 12/2012 | McGarry | ............... | G08C 17/02 307/10.1 |
| 2004/0180653 A1 * | 9/2004 | Royalty | ................. | B64D 47/00 455/431 |
| 2011/0255506 A1 * | 10/2011 | Toth | ................... | H04B 7/18506 370/331 |
| 2012/0265372 A1 * | 10/2012 | Hedrick | ................. | H04L 67/36 701/3 |

* cited by examiner

AIRCRAFT AVIONICS MANAGEMENT AND CONTROL SYSTEM

CROSS-REFERENCE TO RELATED APPLICATION(S)

This application claims the benefit of U.S. Provisional Patent Application Ser. No. 61/773,006, filed Mar. 5, 2013, the entirety of which is hereby incorporated herein by reference.

This application is a continuation of, and claims the benefit of, U.S. patent application Ser. No. 14/198,556, filed Mar. 5, 2014, now patented as U.S. Pat. No. 9,293,053, issued on Sep. 22, 2016, the entirety of which is hereby incorporated herein by reference.

BACKGROUND OF THE INVENTION

1. Field of the Invention

The present invention relates, generally, to the field of systems, including apparatuses and methods, for managing and controlling aircraft avionics systems.

2. Description of the Related Art

The cockpits of most military and civilian aircraft are generally small, cramped spaces in which real estate is at a premium. Since World War II, the cockpits of military and civilian aircraft have become increasingly crowded with different types of avionics systems, including, but not limited to, communications, navigation, flight control, radar, collision avoidance, transponder, weather, and weapons systems. To make matters worse, each avionics system generally has its own control/display head and many aircraft may have more than one of each different type of avionics system for redundancy or because each type has different capabilities and/or certain advantages over others. For example, in many military aircraft, the cockpits include multiple communications systems in the form of radios such as the ARC-210, ARC-231, PRC-117G, and/or SSDL (Small Secure Data Link) radios. Similarly, the cockpits may include multiple navigation systems in the form of TACAN (Tactical Air Navigation) systems, GPS (Global Positioning System) systems, and/or EGI (Embedded Global Positioning/Inertial Navigation) systems. Also, the cockpits may include one or more transponder systems in the form of the APX-118 and/or APX-119 transponders.

In addition to each avionics system consuming a certain amount of valuable cockpit space, the control/display head of each avionics system typically has control knobs, buttons, displays, lights, electronic circuit boards, and enclosures that differ in number, type, shape, design and operation from system-to-system and manufacturer-to-manufacturer. To ensure proper operation of the avionics systems, such systems must be properly maintained, thereby requiring technicians to be properly trained with respect to maintaining and operating many different avionics systems and requiring a large number of different control knobs, buttons, displays, lights, electronic circuit boards, enclosures, associated hardware, and other replacement parts to be stocked and available for use in repairs. Additionally, to minimize mistakes and errors in using the various avionics systems (which are inherently a problem and/or concern when so many different avionics systems are present and used), pilots must be properly trained in the correct use and/or operation of each different avionics system (and their different control knobs, buttons, displays, lights, user interfaces, and methods of operation) in both normal and backup modes of operation. Thus, technicians and pilots must spend a substantial amount of time in initial and refresher training at great cost to their employers.

Therefore, there is a need in the industry for a system, apparatuses, and methods that enables pilots to use and operate many different avionics systems easily and absent mistake with minimal training, while reducing (i) the amount of cockpit space used for avionics systems, (ii) the number of different replacement parts that must be stocked and available for repairs, and (iii) the number of hours of training required for technicians, and, that resolves these and other difficulties, shortcomings, and problems with current devices and methods.

SUMMARY OF THE INVENTION

Broadly described, the present invention comprises an aircraft avionics management and control system, including an apparatus and methods, for consolidating aircraft avionics management and control operations and for allowing universal management, control, and operation of a plurality of communications systems, navigation systems, transponder systems, and other avionics systems with a single device. The communication systems may comprise a plurality of military radios, civilian radios, or other communication systems of different types and may have different manufacturers. Similarly, the navigation systems and transponder systems may comprise navigation systems and transponder systems of different types and may have different manufacturers. The communication systems, navigation systems, transponder systems, and other avionics systems may be communicatively connected to the aircraft avionics management and control system via different types of communication links having different communications protocols and/or different standards.

In an example embodiment, the aircraft avionics management and control system provides pilots and other users with intuitive graphical user interfaces that enable use of the system with very little training. The system uses the seven (7) standard aviation colors along with the standard use of cursor operations to allow pilots and other users to rapidly develop basic operational capability. Use of the standard aviation colors provides visual cues as to the state of operation of the connected devices and options for use. The system provides common controls (including, but not limited to, many controls and soft keys implemented in graphics) for use by pilots and other users to control connected communications, navigation, transponder, and other avionics systems. And, spin-push concentric knobs are employed for data entry instead of keypads and allow a pilot or other user to quickly change frequencies on radios, search through lists of navigational data, and to review and change statuses on various other avionics systems.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
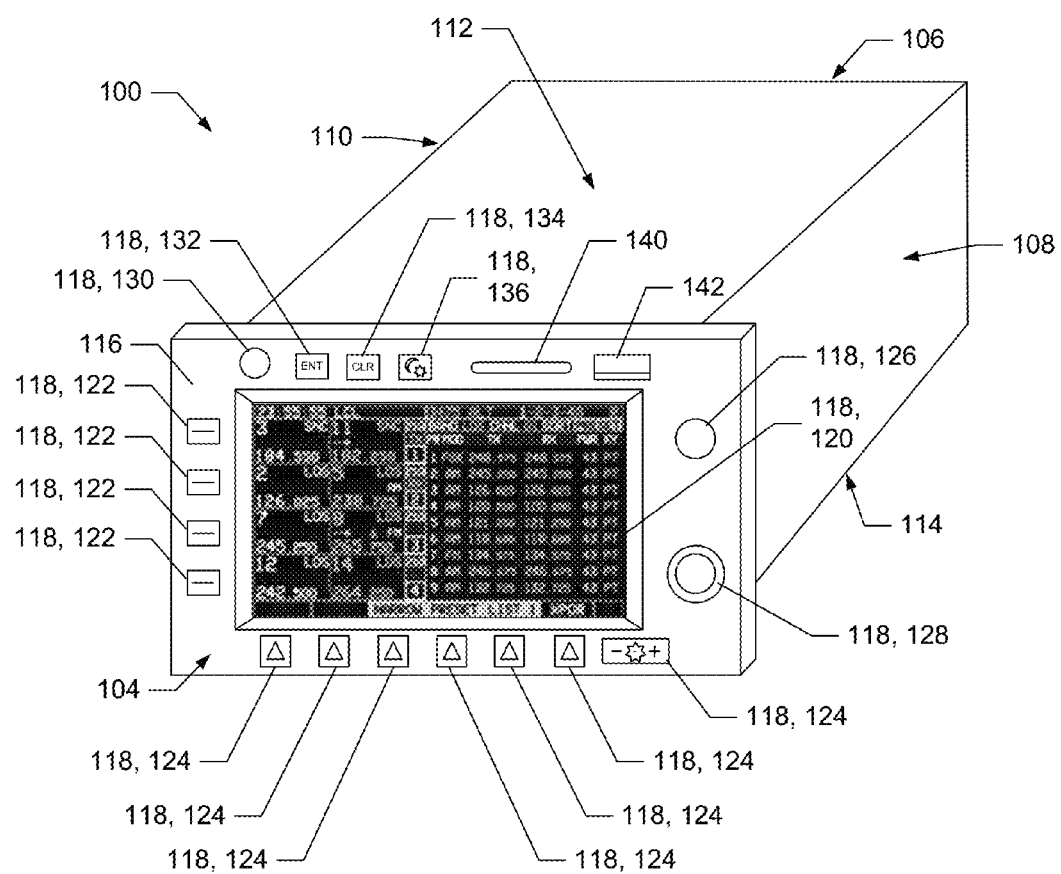
FIG. 1 displays a front perspective, schematic view of an aircraft avionics management and control system in accordance with an example embodiment of the present invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to the drawings in which like numerals represent like elements or steps throughout the several views, FIG. 1 displays a front perspective, pictorial view of an aircraft avionics management and control system 100, in accordance with an example embodiment of the present invention, for consolidating management, control, and operation of aircraft avionics systems and allowing control and operation of multiple, different, connected military and civilian communications systems, navigation systems, transponder systems, and other avionics systems with a single device. The avionics management system 100 (also sometimes referred to herein as the "system 100") uses the seven (7) standard aviation colors along with the standardized use and implementation of cursor operations for and across all connected avionics systems, thereby enabling pilots to have basic operational capability and control of such connected avionics systems after minimal training. Because the system 100 interacts with and controls multiple, different connected communications systems, navigation systems, transponder systems, and other avionics systems, the system 100 eliminates the need for each avionics system to have its own control display unit located in an aircraft cockpit and, thus, reduces the number of devices that are present in an aircraft cockpit. By reducing the number of devices, the system 100 minimizes the amount of space used by avionics systems in an aircraft cockpit and minimizes the number of devices that must be maintained and for which replacement parts stocked for repairs.

As described briefly above, the system 100 is adapted to control and operate multiple, different, connected military and civilian communications systems, navigation systems, transponder systems, and other avionics systems. According to the example embodiment, the communications systems include, without limitation, the ARC-210, ARC-231, PRC-117G, and/or SSDL (Small Secure Data Link) radios. Similarly, according to the example embodiment, the navigation systems include, but are not limited to, TACAN (Tactical Air Navigation) systems, GPS (Global Positioning System) systems, and/or EGI (Embedded Global Positioning/Inertial Navigation) systems. Also, according to the example embodiment, the transponder systems include, without limitation, the APX-118 and APX-119 transponders. It should be appreciated and understood that in other example embodiments, the system 100 may be configured to control and operate other communications, navigation, transponder, and other avionics systems available now or in the future.

The system 100 comprises an enclosure 102 having a front 104 and opposed back 106, right side 108 and opposed left side 110, top 112 and opposed bottom 114. The enclosure 102 has a front panel 116 at the enclosure's front 104 that is visible and accessible to a pilot or other user when the system 100 is mounted in an aircraft cockpit. The enclosure 102 houses an electronic circuit board 160 (see FIG. 3) having electronic circuitry that, alone or in conjunction with other system components, provides the capabilities/functionality and enables operation of the system 100 as described herein. The enclosure 102 includes a plurality of communication connectors at the back 106 that are electrically and communicatively connected to the system's electronic circuit board 160 and electronic circuitry. The communication connectors connect the system 100 physically, electrically, and communicatively to multiple communication, navigation, transponder, and/or other avionics systems of the same, or different, types and manufacturers. In order to support connection to and operation of the system 100 with avionics systems of different types and manufacturers, the system 100 and its communication connectors implement a variety of hardware and software data/signal communication standards, protocols, and/or specifications. For example, according to the example embodiment, the system 100 and its communication connectors implement the MIL-STD-1553 standard, CAN (Controller Area Network) bus standard, serial standards such as RS-232 and RS-422, and Ethernet standards such as 802.11a, b, g, n. It should be appreciated and understood that in other example embodiments, the system 100 and its communication connectors may be configured to and implement other hardware and software data/signal communication standards, protocols, and/or specifications.

The front panel 116 includes a plurality of user interface and interaction components 118 that are electrically and communicatively connected to the system's electronic circuitry and through which the system 100 outputs information and/or data to a pilot/user or receives input information and/or data from a pilot/user that relates to the communications, navigation, transponder, and other avionics systems connected to the system 100. More specifically, the user interface and interaction components 118 include a display device 120 by which the system 100 outputs information and/or data. According to the example embodiment, the display device 120 comprises a thin film transistor (TFT), color, liquid crystal display capable of displaying information and/or data in at least the seven (7) standard colors commonly used in aviation avionics systems. The display device 120 is adapted to output such information and/or data via graphical user interfaces displayed by the display device 120. The graphical user interfaces are uniquely configured for the different types of connected avionics systems, include one or more graphical user interfaces for each connected avionics system, and are generally displayed in response to appropriate pilot and/or other user input to the system 100. Also, the graphical user interfaces are configured to operate in conjunction with the system's user interface and interaction components 118 for the receipt of input from pilots and/or other users. Additionally, the graphical user interfaces may include visual cues indicating the operational state of the avionics systems connected to the system 100, and software-generated labels indicating or associated with functions/operations selected by depression of a soft key 124 (described below) of the front panel 116.

The user interface and interaction components 118 also include a plurality of line select keys 122 arranged along the left side of the display device 120 and a plurality of soft keys 124 configured beneath the display device 120 that are backlit. The system 100 uses the line select keys 122 to receive selection of a radio by a pilot or other user, for example, for use or interaction with. The system 100 utilizes the soft keys 124 to receive selection by a pilot or other user of functions/operations to be performed that depend on the particular type of avionics system then being interacted with. The functions/operations available for selection are indicated by labels displayed above the soft keys 124 by the system's display device 120 and, more particularly, by the particular graphical user interface displayed at the time of selection.

Additionally, the user interface and interaction components 118 include an encoder pushbutton 126 and spin-push concentric knobs 128 that are located near the right side of the display device 120. The system 100 uses input received via the encoder pushbutton 126 from a pilot or other user to, for example, invoke communication channel selection. The system 100 utilizes input received through operation of the concentric knobs 128, for example, to receive the selection and input of a radio frequency and, in connection with certain graphical user interfaces, to control the movement of a cursor within the graphical user interfaces. The system's employment of the encoder pushbutton 126 and spin-push concentric knobs 128 and their use in conjunction with the system's graphical user interfaces eliminates the need for a keypad to enter data (such as, for example, radio, navigation and other frequencies) into the system 100.

In addition, the user interface and interaction components 118 include a power/volume/squelch knob 130, an enter button 132, a clear button 134, a luminance mode button 136, and a luminance toggle key 138. The system 100 receives input from a pilot or other user via the power/volume/squelch knob 130 and responsive to such input and in accordance with the then current mode of the system's operation, switches the supply of electrical power to the system 100 on or off, adjusts the volume of the active radio(s) up or down, or sets the signal level for use in squelch control. The system 100 uses the enter button 132 and clear button 134 to receive input from a pilot or other user indicating, respectively, acceptance of a previous input or selection from a graphical user interface or non-acceptance of the same. Based on such acceptance or non-acceptance and the then current mode of operation and displayed graphical user interface, the system 100 takes appropriate further action. The system 100 receives input from a pilot or other user via the luminance mode button 136 and, in response, switches the system's display device 120 and/or backlighting of the line select keys 122 and soft keys 124 between day and night luminance ranges/modes. In the night luminance range/mode, the system's backlighting is capable of achieving NVIS (Night Vision Lighting System) Class B compatibility. The particular luminance level desired within the selected luminance range is received from a pilot or other user via the luminance toggle key 138. Responsive to operation of the luminance toggle key 138, the system 100 increases or decreases the luminance level of the display device 120 and/or of the backlighting of the line select keys 122 and soft keys 124.

The front panel 116 also includes an SD (Secure Digital) memory card connector 140 and a USB (Universal Serial Bus) connector 142 to the right of the luminance mode button 136. The SD memory card connector 140 is adapted to bi-directionally exchange data with a connected SD memory card, while the USB connector 142 is configured to bi-directionally exchange data with an inserted USB memory device. The system 100 interacts with a connected SD memory card or USB memory device to receive and upload radio preset data from such SD memory card or USB memory device or to export and download radio preset data to such SD memory card or USB memory device.

Figure 2:
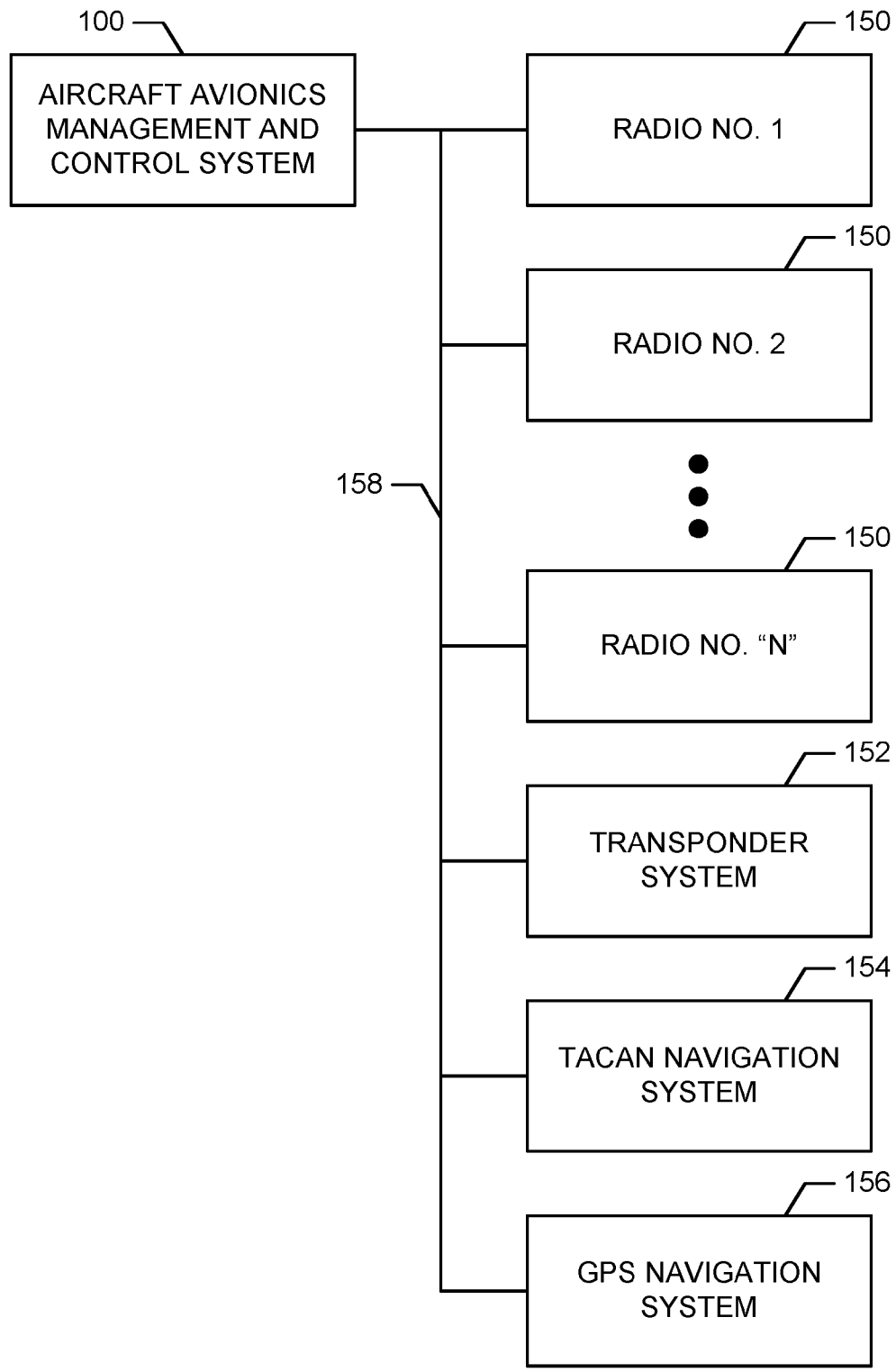
FIG. 2 displays a block diagram representation of the aircraft avionics management and control system of FIG. 1 illustrating the system connected to a plurality of communications, navigation, and transponder systems during use.

As described briefly above, the system 100 is configured to control, operate, and interact with a plurality of communications, navigation, transponder, and other avionics systems. To illustrate this capability, FIG. 2 displays a block diagram representation of the system 100 in use and communicatively connected to multiple radios 150, a transponder system 152, a TACAN (Tactical Air Navigation) navigation system 154, and a GPS (Global Positioning System) navigation system 156 by one or more communication channels 158 implemented and operating according to, for example, one or more of a MIL-STD-1553 standard, CAN (Controller Area Network) bus standard, serial communication standard, and/or Ethernet standard. According to the example embodiment, the first, second, and "nth" radios 150A, 150B, 150N may respectively comprise an ARC-210, ARC-231, and PRC-117G radios. It should be appreciated and understood that while the system 100 is illustrated in FIG. 2 as being connectable and operable with one transponder 152, a TACAN (Tactical Air Navigation) navigation system 154, and a GPS (Global Positioning System) navigation system 156, the system 100 is connectable and operable with other types and numbers of transponders, navigation systems, and avionics systems in other example embodiments.

Figure 3:
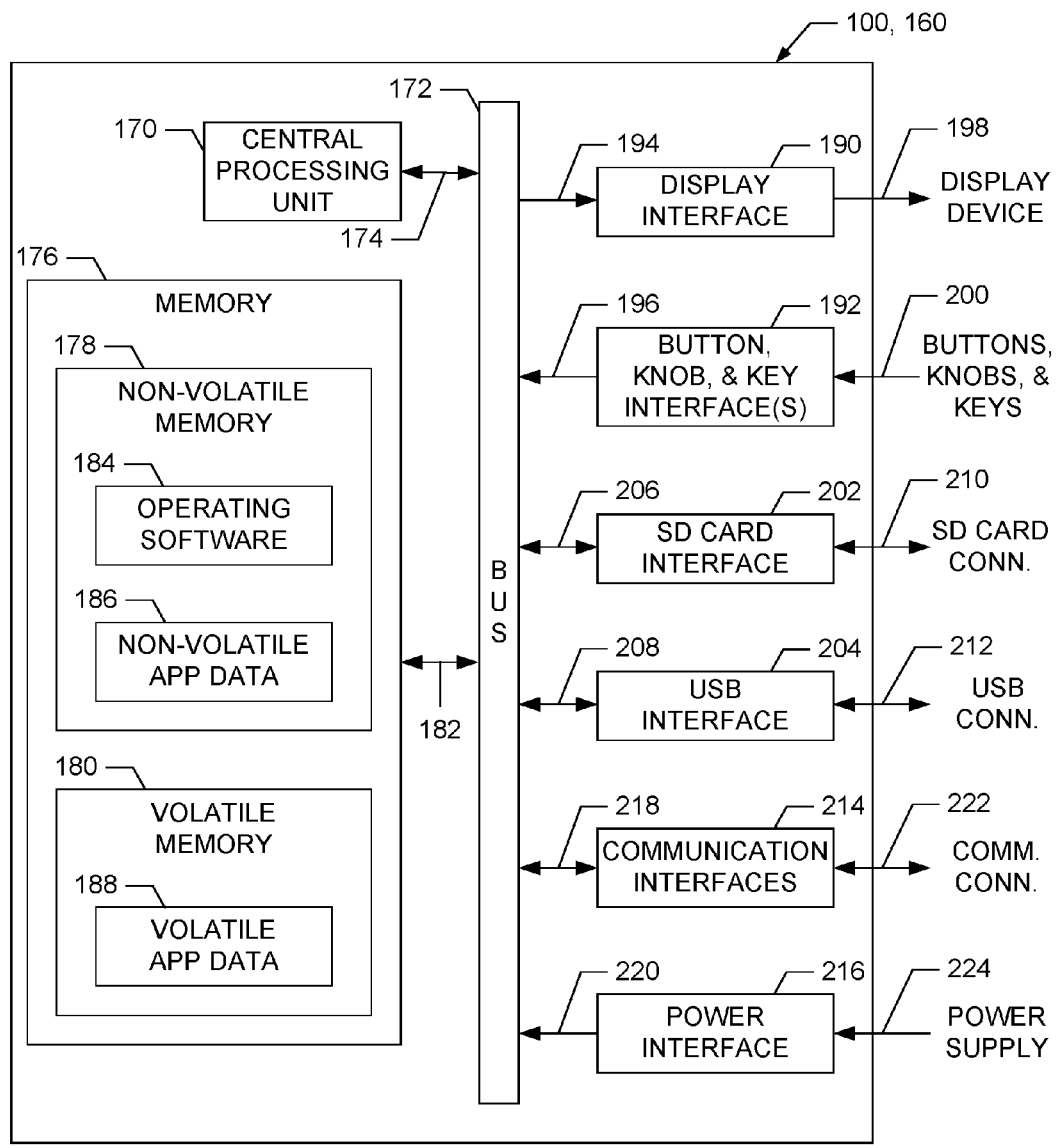
FIG. 3 displays a block diagram representation of a circuit board of the aircraft avionics management and control system of FIG. 1.

FIG. 3 displays a block diagram representation of a circuit board 160 (including electronic circuitry) of the system 100 in accordance with the example embodiment. The circuit board 160 comprises a central processing unit 170 that is electrically and communicatively connected to a bus 172 via appropriate signal paths 174 for the bi-directional communication of data with other components of the system 100. The central processing unit 170 is adapted to execute computer software instructions, causing the system 100 to perform as described herein. The central processing unit 170 may comprise a microprocessor, arithmetic logic unit (ALU), application specific integrated circuit (ASIC), or other similar electronic device having similar capabilities, alone or in combination. The bus 172 comprises a plurality of bi-directional communication paths for the bi-directional communication of computer software instructions, address, data, and various other control signals necessary for operation of the system 100.

The circuit board 160 also comprises a memory 176, including non-volatile memory 178 and volatile memory 180. The memory 176 is communicatively connected to bus 172 for the bi-directional communication of computer software instructions, address, data and control signals with the bus 172 and other system components connected to the bus 172, through one or more bi-directional signal paths 182. Non-volatile memory 178 generally stores information and/or data that will not be lost when electrical power to the non-volatile memory 178 is removed. Examples of non-volatile memory 178 include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 180 typically stores information and/or data for a temporary period of time, as such information and/or data that will be lost when electrical power is no longer supplied to the volatile memory 180. Examples of volatile memory 180 include, but are not limited to, non-battery backed up random access memory devices.

According to the example embodiment, non-volatile memory 178 stores a plurality of computer software instructions of the system's operating software 184 that, when delivered to and executed by central processing unit 170, enables and causes the system 100 to perform the functions, operations, and methods described herein. The operating software 184 is configured according to the layered software configuration described in more detail with respect to FIG. 4, and includes, in addition to computer software instructions, data corresponding to the various graphical user interfaces presented to a pilot or other user of the system 100 via display device 120 during operation of the system 100. In addition, non-volatile memory 178 stores non-volatile data 186 that is used by the operating software 184 during execution and/or that may be displayed or presented to a user during execution thereof. Such non-volatile data 186 may include, but not be limited to, data representative of or corresponding to preset data (including, but not limited to, transmit and receive frequencies, signal modulation type, transmit power level, encryption type, and other configuration data) previously loaded into the system 100 for each radio connected to the system 100, TACAN system data (including, without limitation, channel/frequency, transmit/receive operation mode, and other configuration data) for the TACAN stations being used, transponder system data (including, but not limited to, transponder channels/frequencies, operation mode, code, and other configuration data) for the transponders being used, and other data previously loaded into the system 100 and used by the system 100 during operation to interact with and control the operation of the various communications, navigation, transponder, and other avionics systems connected to the system 100.

Volatile memory 180 stores volatile data 188 that is created, received, and/or used by the system 100 and central processing unit 170 during operation of the system 100 and execution of the operating software 184. Volatile data 188 may include, for example: data corresponding or related to the radios currently being used for communications, the radios currently identified as standby radios, and the present bearing and range data for each TACAN station currently being used; data for display via the system's graphical user interfaces and display device 120; data representative of the then current status of the connected communications, navigation, transponder, and other avionics systems; data received from or ready for communication to the connected communications, navigation, transponder, and other avionics systems; data corresponding to inputs received from a pilot or other user via the system's user interface and interaction components 118; and, data representative of the results of a calculation, intermediate data, and other information and/or data.

The circuit board 160, in accordance with the example embodiment, additionally comprises a display interface 190 and one or more button/knob/key interfaces 192 that are connected, respectively, to bus 172 by signal paths 194 and 196. The display interface 190 receives, via bus 172 and signal paths 174, 194, data corresponding to the system's graphical user interfaces and to data pertaining to the connected avionics systems for display within the graphical user interfaces. The display interface 190 uses the received data to produce corresponding electrical signals/data that are communicated to the system's display device 120 via signal paths 198 and that cause the display device 120 to display the graphical user interfaces and data for the avionics systems.

The button/knob/key interfaces 192 are connected to the buttons, knobs, and keys of the system's user interface and interaction components 118 through signal paths 200. The button/knob/key interfaces 192 receive data and/or signals via signal paths 200 that are representative of the operation of such buttons, knobs, and keys by a pilot or other user to provide the system 100 with input information and/or selections from the graphical user interfaces. The button/knob/key interfaces 192 process the received data and/or signals to generate data corresponding to the input information and/or selections and communicate the generated data to the central processing unit 170 through the bus 172 and signal paths 174, 196. Then, the central processing unit 170 takes appropriate actions based on the received input information and/or selections and in accordance with (and as directed by) the operating software 184.

In addition, the circuit board 160 comprises an SD (Secure Digital) memory card interface 202 and USB (Universal Serial Bus) interface 204 that are connected to bus 172 by bi-directional signal paths 206, 208, respectively. The SD (Secure Digital) memory card interface 202 also connects to the SD (Secure Digital) memory card connector 140 via bi-directional signal paths 210 and the USB (Universal Serial Bus) interface 204 also connects to the USB (Universal Serial Bus) connector 142 via bi-directional signal paths 212. During operation of the system 100, the SD (Secure Digital) memory card interface 202 processes data being communicated between an SD (Secure Digital) memory card coupled to the SD (Secure Digital) memory card connector 140 and the system's central processing unit 170 via bus 172 and bi-directional signal paths 174, 206, 210 to ensure that the data is communicated correctly. Similarly, during operation of the system 100, the USB (Universal Serial Bus) interface 204 processes data being communicated between a USB (Universal Serial Bus) memory device coupled to the USB (Universal Serial Bus) connector 142 and the system's central processing unit 170 via bus 172 and bi-directional signal paths 174, 208, 212 to ensure that the data is communicated correctly. The data read from or written to a connected SD (Secure Digital) memory card or USB (Universal Serial Bus) memory device may include, for example and not limitation, radio preset data that is to be loaded into the system 100 or exported to a similar system 100 in a different aircraft.

Further, the circuit board 160 comprises multiple communication interfaces 214 and a power interface 216 that are connected to bus 172, respectively, through bi-directional signal paths 218 and signal paths 220. The communication interfaces 214 are connected to the communication connectors located at the back 106 of the system's enclosure 102 through bi-directional signal paths 222. The communication interfaces 214 communicate data between the central processing unit 170 and the communication connectors (and, hence, with the communications, navigation, transponder, and other avionics systems connected to the communication connectors) via bus 172 and signal paths 174, 218, 222. The communication interfaces 214 send and receive data to/from the communication connectors in accordance with the communication standards/protocols (for example and not limitation, the MIL-STD-1553 standard, CAN (Controller Area Network) bus standard, serial standards such as RS-232 and RS-422, and Ethernet standards such as 802.11a, b, g, n) appropriate for the respective communication connectors and connected avionics systems.

The power interface 216 is connected to an aircraft's electrical power system and receives electrical power at one or more voltages from the aircraft's electrical power system through signal paths 224. The power interface 216 conditions and/or filters the received electrical power and produces electrical signals on signal paths 220 at the voltages required by the circuit board's electronic components. In addition and in some embodiments, the power interface 216 may also include one or more rechargeable batteries for storing and supplying electrical power to the circuit board's electrical components in the event of an aircraft electrical power system failure.

Figure 4:
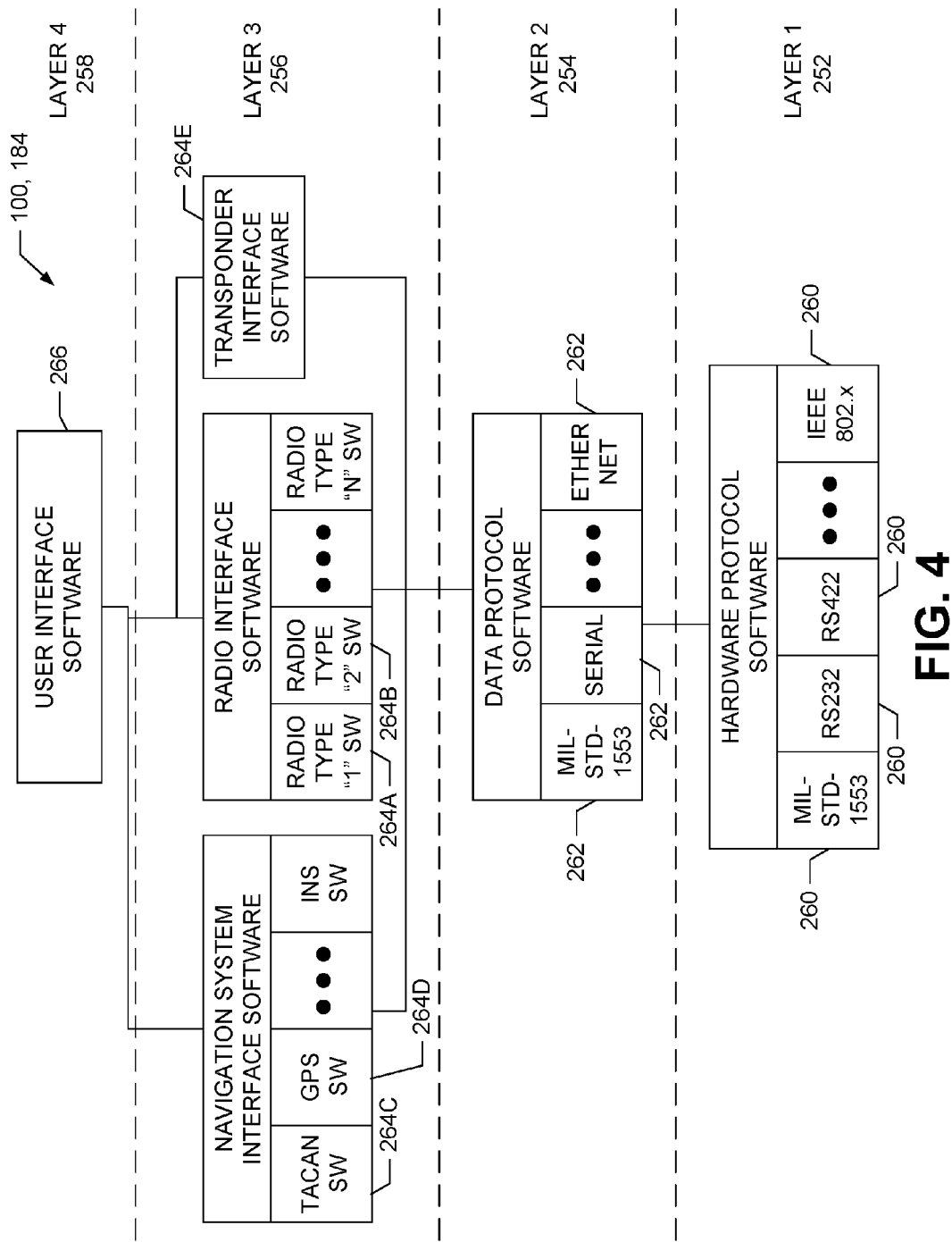
FIG. 4 displays a block diagram representation of operating software of the aircraft avionics management and control system of FIG. 1, showing the layered structure of the operating software.

Turning now to the system's operating software 184 and as briefly described above, the system's operating software 184 has a layered structure 250 as illustrated in the block diagram representation of the operating software 184 seen in FIG. 4. The layered structure 250 enables the operating software 184 to be readily modified to incorporate new computer software instructions and graphical user interfaces that enable the system 100 to operate and control communications, navigation, transponder, and/or other avionics systems that are not already supported by the system 100. The layered structure 250 includes four layers 252, 254, 256, 258 arranged from low-level to high-level software. The first layer 252 comprises the lowest level of the operating software 184 which implements the hardware protocols for the data communications standards/protocols supported by the system 100. The second layer 254 is arranged above the first layer 252 and implements the data protocols for the data communications standards/protocols supported by the system 100. Configured above the second layer 254 is the third layer 256 that implements the command and control interface between the system 100 and the various communications, navigation, transponder, and other avionics systems supported by the system 100. The fourth layer 258 is arranged above the third layer 256 and implements the system's user interface (including, without limitation, the graphical user interfaces displayed on display device 120 and interaction with the various other user interface and interaction components 118).

The first layer 252 of the system's operating software 184, as briefly described above, implements the hardware protocols for the data communications standards/protocols supported by the system 100. The first layer 252 includes a plurality of software modules 260 of the operating software 184 with each software module 260 corresponding in a one-to-one relationship with a particular hardware protocol (for example and not limitation, MIL-STD-1553, RS232, RS422, IEEE 802.11x). When executed, the software modules 260 cause data being sent to a connected avionics system to be configured for transmission according to the particular hardware protocol (for example and not limitation, MIL-STD-1553, RS232, RS422, IEEE 802.11x) used to communicate with the connected avionics system. The software modules 260 also, when executed, cause data received from a connected avionics system to be converted from the particular hardware protocol used to communicate with the connected avionics system.

As briefly described above, the second layer 254 of the system's operating software 184 implements the data protocols for the data communications standards/protocols supported by the system 100. Thus, the second layer 254 includes a plurality of software modules 262 of the operating software 184 with each software module 262 corresponding in a one-to-one relationship with a particular data protocol (for example and not limitation, MIL-STD-1553, serial, Ethernet) used for communications with connected avionics systems. Execution of the software modules 262 causes data being sent to a connected avionics system to be configured for transmission according to the particular data protocol used to communicate with the connected avionics system. Execution of the software modules 262 also causes data received from a connected avionics system to be converted from the particular data protocol used to communicate with the connected avionics system.

The third layer 256 of the system's operating software 184, as briefly described above, implements the interface between the system 100 and the particular type of communications, navigation, transponder, and other avionics systems supported by the system 100. Thus, the third layer 256 includes a plurality of software modules 264 of the operating software 184 that are uniquely tailored to generate commands/instructions for communication to, and to interpret data received from, such particular types of communications, navigation, transponder, and other avionics systems. For example, the plurality of software modules 264 includes software module 264A for interfacing the system 100 with a first radio type, software module 264B for interfacing the system 100 with a second radio type, software module 264C for interfacing the system 100 with a TACAN navigation system, software module 264D for interfacing the system 100 with a GPS navigation system, and software module 264E for interfacing the system 100 with a transponder system.

The fourth layer 258 of the system's operating software 184, as briefly described above, implements the system's user interface (including, without limitation, the graphical user interfaces displayed on display device 120 and interaction with the various other user interface and interaction components 118). The fourth layer 258 includes user interface software 266 that, when executed, causes the display of the system's graphical user interfaces and appropriate data on the display device 120, receives and processes inputs made by a pilot or other user via the buttons, knobs, and/or keys of the user interface and interaction components 118, receives and processes data received from connected communications, navigation, transponder, and other avionics systems, and performs actions based on the received inputs and data. For example, in response to receiving user input selecting a particular display mode, the user interface software 266 causes the display device 120 to display a graphical user interface corresponding to the selected display mode.

Figure 5:
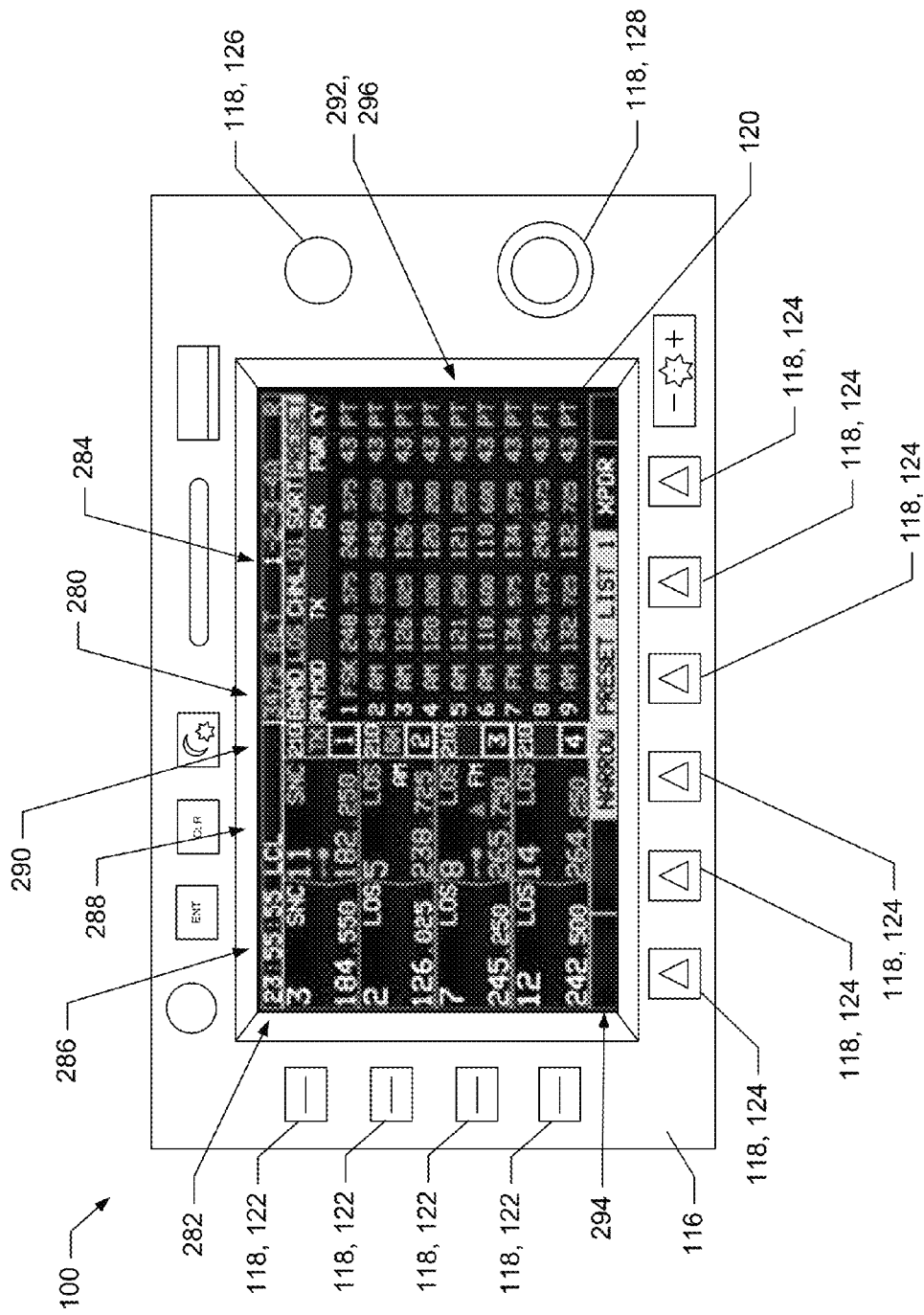
FIG. 5 displays a front, schematic view of the front panel of the aircraft avionics management and control system of FIG. 1, showing first and second graphical user interfaces of the system.

FIG. 5 displays a schematic view of the front panel 116 and first and second graphical user interfaces 280, 296 of the system 100 in accordance with the example embodiment. The first graphical user interface 280 is displayed by the display device 120 when the system 100 is operating in "narrow" mode. The first graphical user interface 280 includes a time and system message area 282 and a transponder status area 284 at the top thereof. The system 100 displays the current time in the time and system message area 282 in a format established during setup of the system 100 and displays system alerts or messages to the right of the current time as necessary. In the transponder status area 284, the system 100 continually displays the current transponder code, mode, reply indicator, and status data for a transponder system connected to the system 100.

The first graphical user interface 280 also includes an active preset and frequency box 286 in a first column, a standby preset and frequency box 288 in a second column, a channel status box 290 in a third column, and a multifunction area 292 in a fourth column. The active preset and frequency box 286 is configured to have four (4) separate sub-boxes corresponding to different active presets and to different line select keys 122. In each sub-box and for each active preset, the system 100 displays a preset number corresponding to a preset on a list of presets, an operational band indicator identifying the band associated with the preset, a channel modulation type code indicating the type of modulation used, a transmit power symbol indicating the power level used for radio transmissions, a cryptographic symbol if a traffic key is in use with cypher text, and the transmit frequency.

The standby preset and frequency box 288 is configured similar to the active preset and frequency box 286 with four (4) separate sub-boxes corresponding to different standby presets and to different line select keys 122. Similar to each sub-box of the active preset and frequency box 286 and in each sub-box of the standby preset and frequency box 288, the system 100 displays a preset number corresponding to a preset on a list of presets, an operational band indicator identifying the band associated with the preset, a channel modulation type code indicating the type of modulation used, a transmit power symbol indicating the power level used for radio transmissions, a cryptographic symbol if a traffic key is in use with cypher text, and the transmit frequency. Upon receiving two pressings of a line select key 122 adjacent an active preset and frequency box 286 during operation of the system 100, the system 100 loads the data for the standby preset and frequency box 288 into the active channel and moves the data for the active preset and frequency box 286 to the standby preset and frequency box 288.

In the channel status box 290, the system 100 displays data indicating the current status of the communications devices on the system's communication channels. The channel status box 290 includes four (4) separate sub-boxes with each sub-box corresponding to a respective communications channel. Each sub-box includes a radio type descriptor identifying the type of radio used by the communication channel, an activity indicator indicating whether the radio is transmitting or receiving, and a channel number identifying the communication channel.

In the multifunction area 292 of the first graphical user interface 280, the system 100 may display other graphical user interfaces, menus, setup data, TACAN presentations, and other data. In FIG. 5, a list of presets is displayed by the system 100 in the multifunction area 292 in a second graphical user interface 296. For each preset, the system 100 displays a unique preset number, a mnemonic indicating the type of modulation used, the transmit and receive frequencies, the power level used for transmitting, and an encryption code mnemonic indicating the type of encryption used. The system 100 copies the data associated with a preset to a standby preset when a pilot or other user operates the spin-push concentric knob 128 to highlight a preset in the list of presets and then select the highlighted preset.

The first graphical user interface 280 additionally includes a soft key label area 294 above the soft keys 124 such that each soft key 124 has a corresponding soft key label. During operation of the system 100, the system 100 displays soft key labels depending on the then current mode of operation, the number of communication channels in use, or based on other factors. For example, if more than four (4) communication channels are in use, the "PAGE" soft key label is displayed for selection in order to cause the display of status data for the other communication channels in the channel status box 290. In another example, the "DETAIL" soft key label is displayed when the system 100 detects the pressing of a line select key 122 and, if the soft key 124 corresponding to the "DETAIL" soft key label is selected, the system 100 displays detailed information for the preset that is loaded into the standby preset of the communication channel corresponding to the pressed line select key 122 so that values of the preset may be changed. In still another example, when the "NARROW" soft key label is displayed and the associated soft key 124 is pressed, the system 100 displays a ladder menu permitting the pilot or other user to select the "NARROW", "WIDE", or "TERSE" format for display of the active and standby presets and frequencies. In a further example, when the "PRESET" soft key label is displayed and the associated soft key 124 is pressed, the system 100 displays the second graphical user interface 296 in the multifunction area 292 of the first graphical user interface 280 as seen in FIG. 5. The second graphical user interface 296 includes a list of presets for selection of a preset as a standby preset for a communication channel. If the associated soft key 124 is pressed again, the system 100 displays detailed data for a preset in another graphical user interface in the multifunction area 292 allowing editing thereof. In yet another example, when the "XPDR" soft key label is displayed and pressing of the associated soft key 124 is received from a pilot or other user, the system 100 displays a transponder related set of soft key labels (see FIG. 6) in the soft key label area 294.

Figure 6:
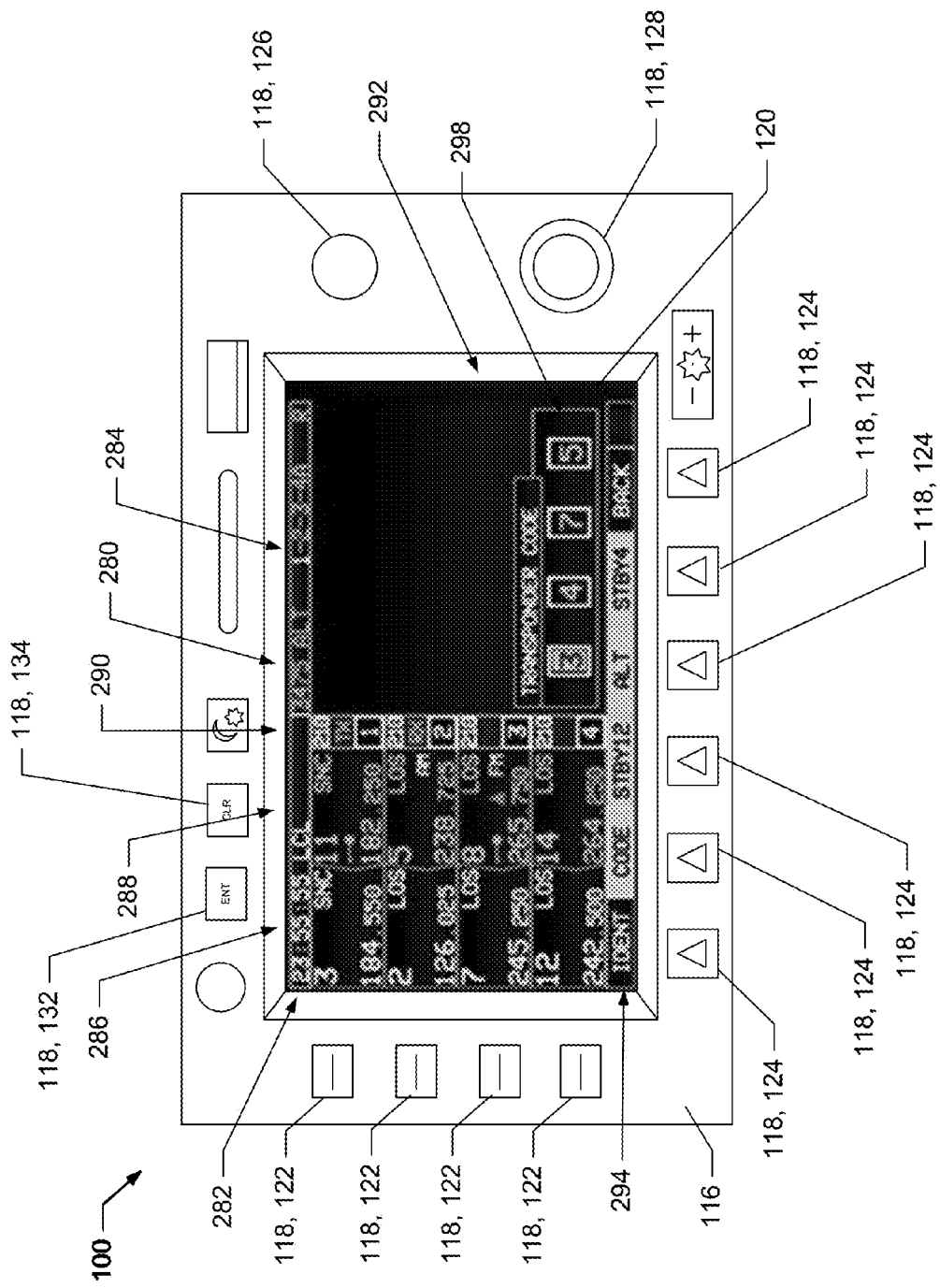
FIG. 6 displays a front, schematic view of the front panel of the aircraft avionics management and control system of FIG. 1, showing first and third graphical user interfaces of the system.

FIG. 6 displays a schematic view of the front panel 116 and first and third graphical user interfaces 280, 298 of the system 100 in accordance with the example embodiment. As illustrated in FIG. 6, the system 100 causes display of the third graphical user interface 298 on the display device 120 in the multifunction area 292 of the first graphical user interface 280 when the system 100 receives selection of the soft key 124 below and associated with the "CODE" soft key label. The third graphical user interface 298 includes a plurality of data entry boxes in which a pilot or other user enters an octal transponder code for a transponder system connected to the system 100 through operation of the spin-push concentric knobs 128 to scroll through and select octal digits. Upon receiving selection of the Enter button 134 by a pilot or other user, the system 100 communicates the new transponder code to the transponder system connected to the system 100 and updates the transponder code displayed in the transponder status area 284 of the first graphical user interface 280. If, instead, the system 100 receives selection of the Clear button 136 by a pilot or other user, the system 100 aborts the change to the transponder code and removes the third graphical user interface 298 from the display device 120.

In addition to the "CODE" soft key label and as seen in FIG. 6, the transponder related set of soft key labels in the soft key label area 294 also includes "IDENT", "STBY12", "ALT", "STBY4", and "BACK" soft key labels. If the system 100 receives selection of the soft key 124 located below the "IDENT" soft key label, the system 100 causes the connected transponder system to transmit the then current transponder code and updates the transponder status area 284 of the first graphical user interface 280 to indicate transmission of the transponder code. Instead, if the system 100 receives selection of the soft keys 124 located, respectively, below the "STBY12" or "STBY4" soft key labels, the system 100 causes the display of respective ladder menus in the multifunction area 292 of the first graphical user interface 280 that allow a pilot or other user to select and cause the connected transponder system to operate in a transponder operating mode such as Mode 1, Mode 2, Mode 1+2, Mode 4/A, or Mode 4/B or to place the transponder system in standby with respect to Modes 1, 2, 1+2, 4A, and 4/B. Alternatively, if the system 100 receives selection of the soft key 124 located below the "ALT" soft label, the system 100 causes the display of a ladder menu in the multifunction area 292 of the first graphical user interface 280 that permits a pilot or other user to select and cause the connected transponder system to operate in Mode 3/C, Mode 3/A, standby mode, or ground mode. In another alternative, if the system 100 receives selection of the soft key 124 located below the "BACK" soft key label, the system 100 causes display of the set of soft key labels shown in FIG. 5 in the soft key label area 294.

Figure 7:
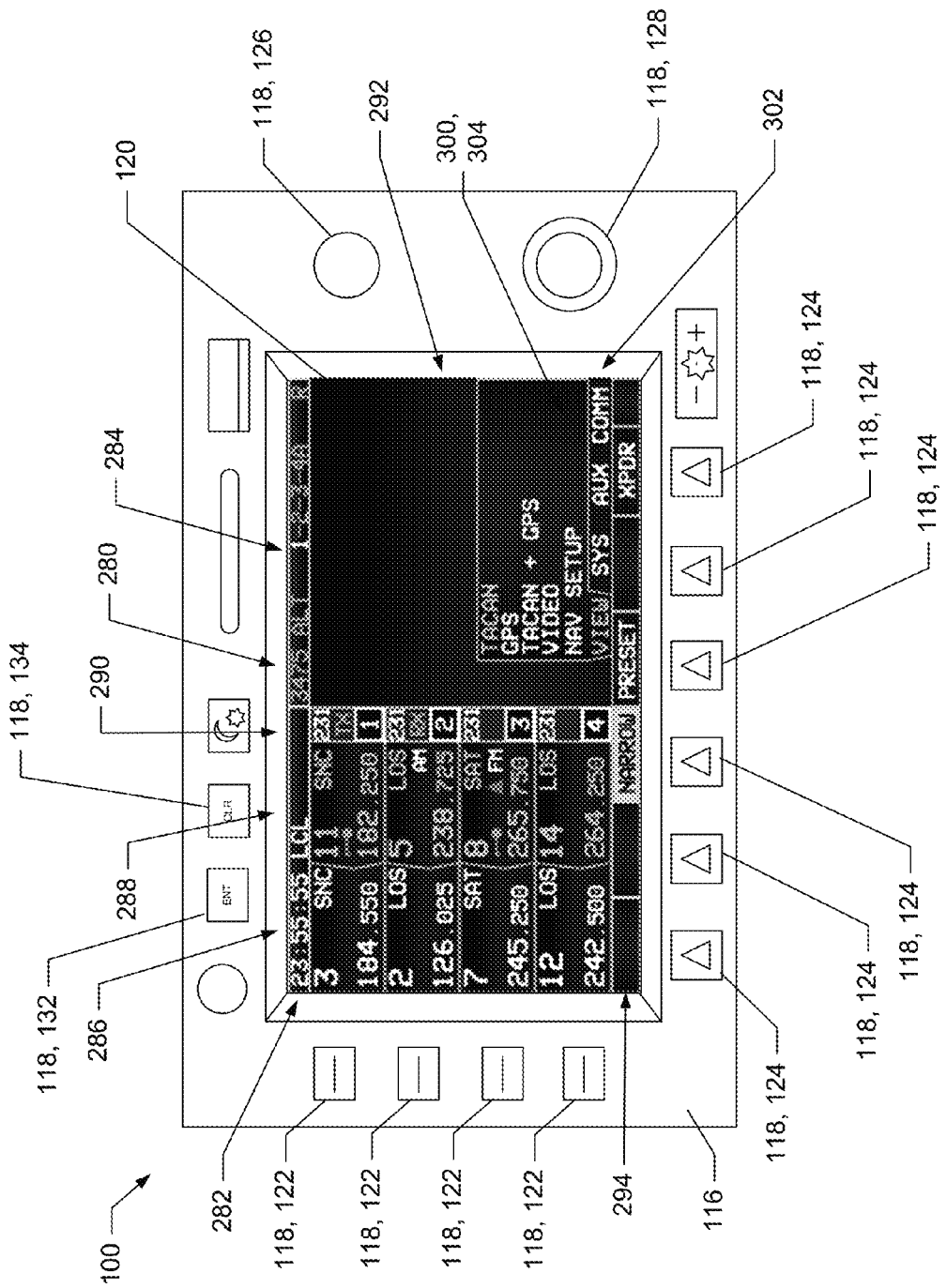
FIG. 7 displays a front, schematic view of the front panel of the aircraft avionics management and control system of FIG. 1, showing the first graphical user interface and a menu of the system.

FIG. 7 displays a schematic view of the front panel 116 and a menu 300 of the system 100 in accordance with the example embodiment. As illustrated in FIG. 7, the system 100 causes display of the menu 300 on the display device 120 in the multifunction area 292 of the first graphical user interface 280 when the system 100 detects rotation of the larger of the spin-push concentric knobs 128. The menu 300 includes a tab line 302 at the menu's bottom that identifies sub-menus for selection and use including "VIEW", "SYS", "AUX", and "COMM" sub-menus. The "VIEW" sub-menu 304, seen in FIG. 7, lists sources of other graphical user interfaces or video that may selected for display in the multifunction area 292 of the first graphical user interface 280. The sources include, but are not limited to, TACAN, GPS, TACAN+GPS, video, and navigation setup. If the system 100 receives selection of the TACAN source, the system 100 causes the display of a fourth graphical user interface 310 (see FIG. 8) that includes data received from the connected TACAN navigation system. Similarly, if the system 100 receives selection of the GPS or TACAN+GPS sources, the system 100 causes display of corresponding graphical user interfaces in the multifunction area 292 that, respectively, include data from the connected GPS navigation system or from the both of the connected TACAN and GPS navigation systems. Instead, if the system 100 receives selection of the video source, the system 100 will display video in the multifunction area 292 that is received by the system 100 from a connected composite video source. Alternatively, if the system 100 receives selection of navigation setup, the system 100 causes display of the then current configuration data for the connected navigation systems and permits editing of such configuration data.

As briefly described above, the tab line 302 of menu 300 also identifies other sub-menus for selection and use including "SYS", "AUX", and "COMM" sub-menus. The "SYS" sub-menu includes a series of graphical user interface pages selectable by a pilot or other user, and used by the system 100 to receive set up input for master variables of the system 100 and to display synoptic pages of connected communications, navigation, transponder, and other avionics systems. The "AUX" sub-menu provides respective graphical user interface pages used by the system 100 to receive input data and directions related to system lighting, file uploading, software updating, and reporting. The "COMM" sub-menu includes graphical user interface pages through which the system 100 receives communication system configuration data, preset uploads, and transponder setup data, and permits access to transponder test and global communications channel status information.

Figure 8:
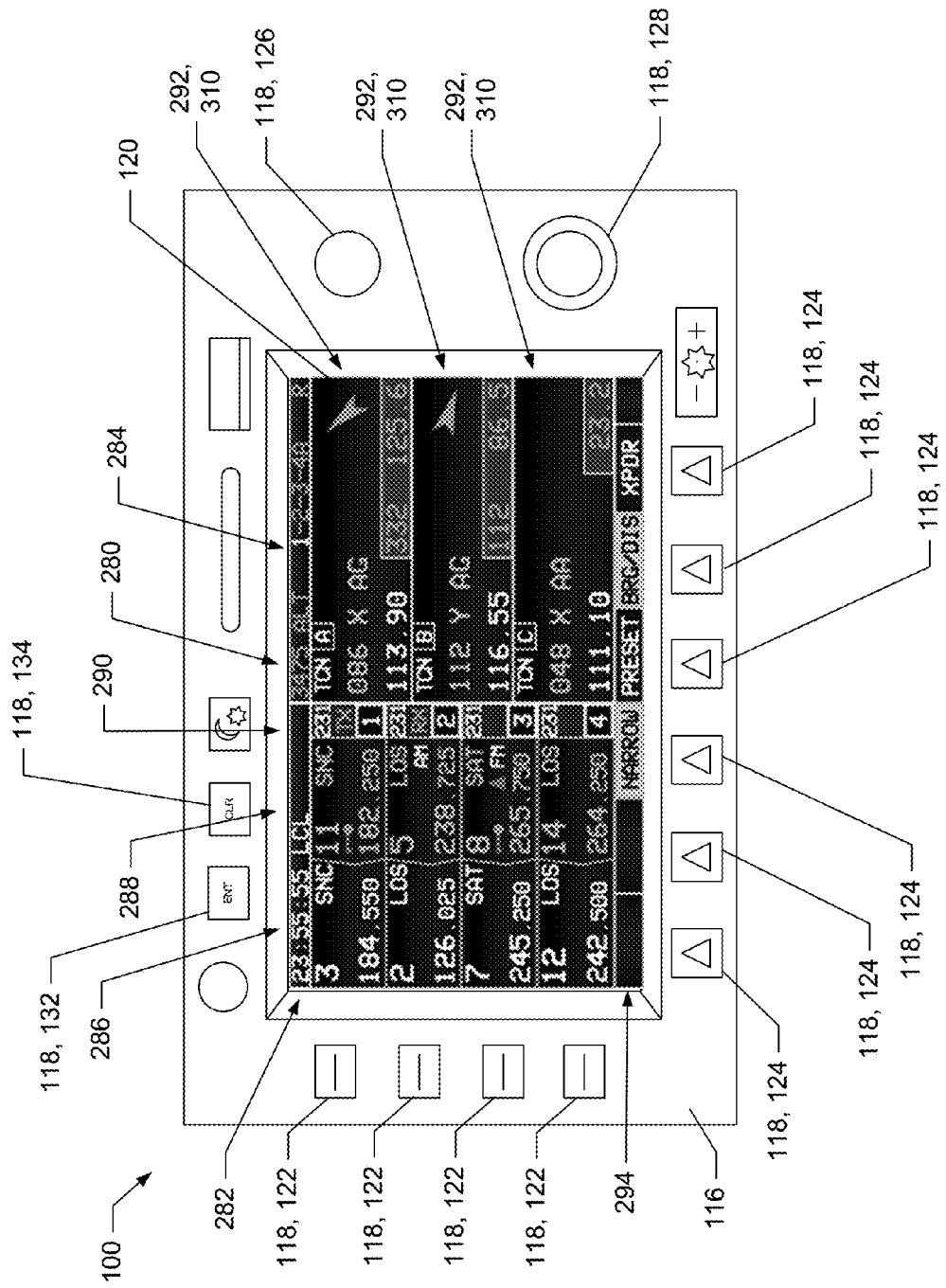
FIG. 8 displays a front, schematic view of the front panel of the aircraft avionics management and control system of FIG. 1, showing first and fourth graphical user interfaces of the system.

FIG. 8 displays a schematic view of the front panel 116 and first and fourth graphical user interfaces 280, 310 of the system 100 in accordance with the example embodiment. The system 100 causes display of the fourth graphical user interface 310 in the multifunction area 292 of the first graphical user interface 280 when the system 100 receives selection of the TACAN source from the "VIEW" sub-menu 304 described above. Upon receiving such selection, the system 100 also causes display of the "BRG/DIS" soft key label in the soft key label area 294. When the "BRG/DIS" soft key label is selected by a pilot or other user pressing the soft key 124 associated with such label, the system 100 presents other options for the display of TACAN data, including, but not limited to, the display of TACAN data via a Radio Magnetic Indicator (RMI) graphical user interface displayed in the multifunction area 292 of the first graphical user interface.

The fourth graphical user interface 310 includes a box 312 for each TACAN channel used by the connected TACAN navigation system. Within each box 312, the system 100 displays data related to a channel including, but not limited to, a channel identifier, the decoded frequency, the bearing and distance to the TACAN site, a bearing symbol graphically indicating the bearing, and other channel data.

Figure 9:
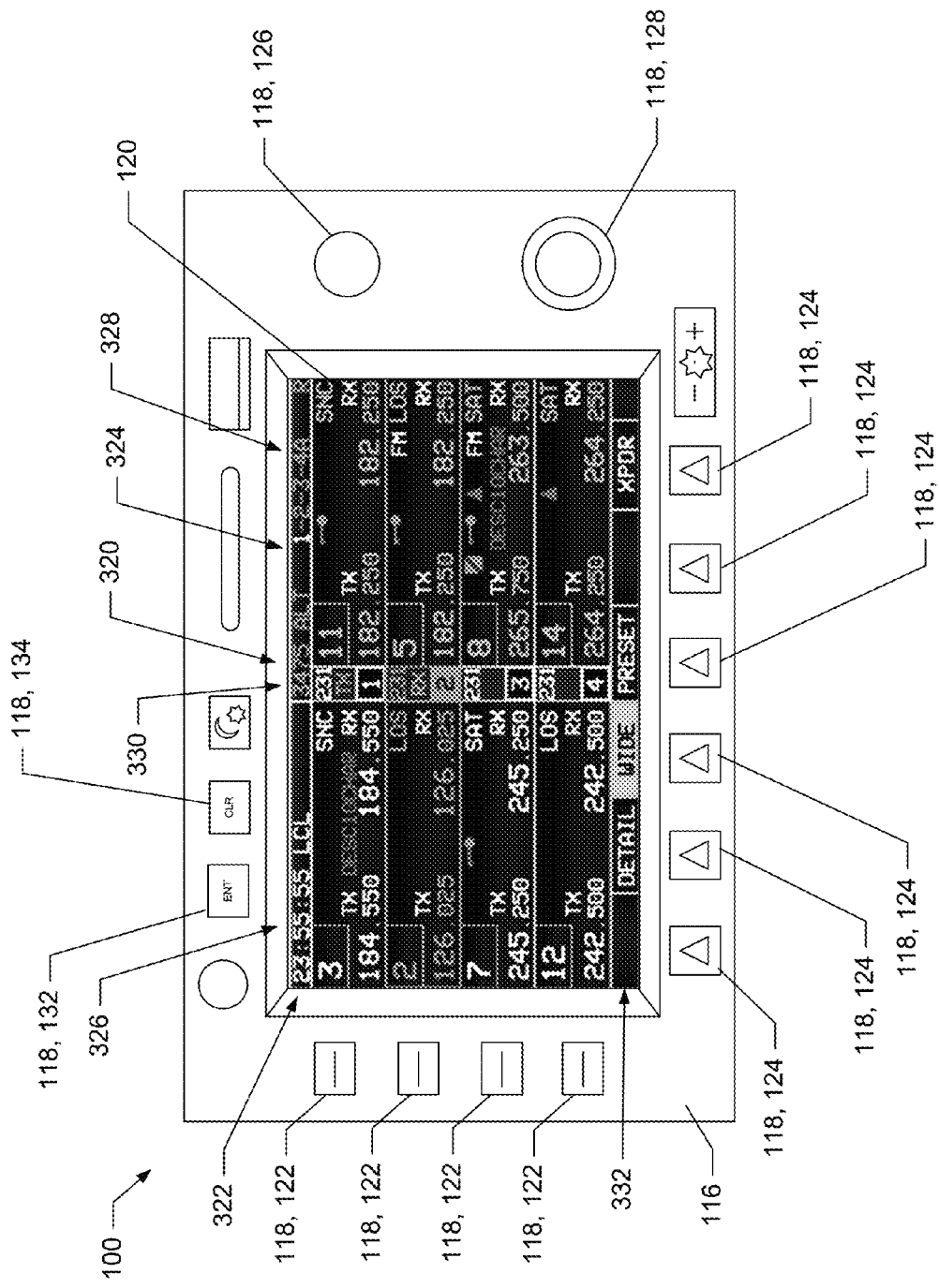
FIG. 9 displays a front, schematic view of the front panel of the aircraft avionics management and control system of FIG. 1, showing first and fifth graphical user interfaces of the system.

FIG. 9 displays a schematic view of the front panel 116 and fifth graphical user interface 320 of the system 100 in accordance with the example embodiment. The fifth graphical user interface 320 is displayed by the system 100 on display device 120 when the system 100 is operating in "WIDE" mode for display of the system's active and standby presets and frequencies. The fifth graphical user interface 320 is similar to the first graphical user interface 280 and includes a time and system message area 322, a transponder status area 324, an active preset and frequency box 326, a standby preset and frequency box 328, a channel status box 330, and a soft key label area 332 that are used in a similar manner and display data similar to the time and system message area 282, a transponder status area 284, an active preset and frequency box 286, a standby preset and frequency box 288, a channel status box 330, and a soft key label area 290 of the first graphical user interface 280.

The fifth graphical user interface 320 does not, however, include a multifunction area 292 as found in the first graphical user interface 320. Because no multifunction area 292 exists, the system 100 displays additional information for each preset of the active preset and frequency box 326 and standby preset and frequency box 328. Thus, the system 100 displays the transmit and receive frequencies for each preset of the active and standby present and frequency boxes 326, 328. The system 100 also displays a split frequency indicator if the transmit and receive frequencies of a preset are different, thereby confirming their difference. Additionally, the system 100 displays a description for each preset if such description was previously input during configuration of the preset. In addition, the system 100 displays a data transmission indicator for each preset if the preset has been previously identified to the system 100 as communicating data instead of voice.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for universal management, control and operation of a plurality of different avionics devices, comprising:
    (a) a plurality of communications links, each coupled to a different one of the plurality of different avionics devices so as to communicate therewith according to a communications protocol associated with the one of the plurality of different avionics devices to which it is coupled;
    (b) a front panel including a display device and a plurality of user input components; and
    (c) a processor that is coupled to each of the plurality of communications links, the processor configured to display data from each of the different avionics devices on the display device so that the data from each of the different avionics devices is shown in a different graphical user interface on the display device and so that each graphical user interface conforms to a common display format, the processor further configured to receive user input for a selected one of the avionics devices through at least one of the plurality of user input components and to transmit the user input to the selected one of the avionics devices through one of the plurality of communication links that is coupled to the selected one of the avionics devices.

2. The system of claim 1, wherein the common display format comprises a plurality of display zones in which each of the plurality of display zones corresponds to a different one of the avionics devices, wherein each display zone comprises:
    (a) an active device section configured to display operational data for a selected device in a first color;
    (b) a standby device section configured to display operational data for the selected device in a second color that is different from the first color; and
    (c) a device status section configured to display at least one of the following parameters associated with the selected device: logical radio number, encryption mode, radio type and operational status.

3. The system of claim 1, wherein the common display format further comprises a preset list portion that includes a list of presets and a preset description next to each preset in the list of presets, in which each preset description includes a description of a frequency associated with each preset and a function associated with each preset.

4. The system of claim 1, further comprising a user data input port, coupled to the processor, that is configured to receive operating data from a user data storage device.

5. The system of claim 4, wherein the operating data includes a plurality of presets for at least one of the avionics devices.

6. The system of claim 4, wherein the data port comprises as selected one of a Universal Serial Bus (USB) interface and a Secure Digital (SD) card interface.

7. The system of claim 1, wherein each of the plurality of communications links comprises:
    (a) a communications connector physically coupled to a bus from a selected one of the avionics devices; and
    (b) a circuit configured to interface communications between the bus and the processor.

8. The system of claim 1, wherein the user input components comprise:
    (a) a plurality of line select keys, in which each line select key is disposed adjacent to a different graphical user interface; and
    (b) a plurality of soft keys, wherein the processor is responsive to both the line select keys and the soft keys, the processor further programmed to: receive an input indicating that a selected one of the line select keys has been actuated and, in response to the input, associating at least a set of the soft keys with the avionics device corresponding to the activated line select key.

9. The system of claim 8, wherein the processor is further programmed to display a plurality of labels, each label adjacent to a different one of the soft keys and each label indicating an action operation with a soft key that is specific to the selected avionics device and that will occur upon actuation of the soft key.

10. The system of claim 8, wherein the processor is further programmed to execute an operation, upon receiving input that a selected one of the set of soft keys has been actuated, that is specific to the selected avionics device and that is associated with the selected one of the set of soft keys.

11. The system of claim 1, wherein the user input components comprise at least one spin-push concentric knob that is configurable by the processor for receiving user input regarding frequency selection and data entry.

12. The system of claim 1, wherein the avionics devices include at least two separate radio systems.

13. The system of claim 1, wherein the processor is programmed by software, stored on a non-transitory computer-readable memory, comprising a plurality of layers, the plurality of layers including:
    (a) a hardware protocol layer that implements hardware protocols for each data communications standard or protocol supported by the system and that includes a plurality of software modules that each correspond in a one-to-one relationship with a selected one of the avionics devices;
    (b) a data protocol software layer that implements the data protocols for each data communications standard or protocol supported by the system and that includes a plurality of software modules that each correspond in a one-to-one relationship with a particular data protocol associated with a selected one of the avionics devices;
    (c) a device interface software layer that implements an interface between the system and each type of avionics device and that includes a plurality of software modules that each generate commands and instructions for communication to a corresponding avionics system and that interpret data received from corresponding avionics system; and
    (d) a user interface software layer that implements a system-wide user interface including, each of the graphical user interfaces displayed on display device and interaction with the user input components and that includes a module that generates the graphical user interfaces and that communicates inputs made by the user to the avionics devices.

14. The system of claim 1, further comprising a luminance mode button disposed on the front panel and in communication with the processor, wherein the processor is configured to cause each graphical user interface to be in a night luminance mode when the luminance mode button is actuated.

15. A universal management, control and operation avionics system for use by a user in an aircraft, comprising:
(a) a plurality of different avionics devices disposed in the aircraft, including at least two separate radio systems;
(b) a single housing disposed within the aircraft;
(c) a plurality of communications links, disposed within the housing, each coupled to a different one of the plurality of different avionics devices so as to communicate therewith according to a communications protocol associated with the one of the plurality of different avionics devices to which it is coupled;
(d) a front panel, affixed to a front portion of the housing, including a display device and a plurality of user input components; and
(e) a processor, disposed within the housing, that is coupled to each of the plurality of communications links, the processor configured to display data from each of the different avionics devices on the display device so that the data from each of the different avionics devices is shown in a different graphical user interface shown on the display device and so that each graphical user interface conforms to a common display format, the processor further configured to receive user input for a selected one of the avionics devices through at least one of the plurality of user input components and to transmit the user input to the selected one of the avionics devices through one of the plurality of communication links that is coupled to the selected one of the avionics devices.

16. The universal management, control and operation avionics system of claim 15, further comprising a user data input port, coupled to the processor, that is configured to receive operating data from a user data storage device.

17. The universal management, control and operation avionics system of claim 15, wherein the operating data includes a plurality of presets for at least one of the avionics devices.

18. The universal management, control and operation avionics system of claim 15, wherein the data port comprises as selected one of a Universal Serial Bus (USB) interface and a Secure Digital (SD) card interface.

19. The universal management, control and operation avionics system of claim 15, wherein each of the plurality of communications links comprises:
(a) a communications connector physically coupled to a bus from a selected one of the avionics devices; and
(b) a circuit configured to interface communications between the bus and the processor.

20. The universal management, control and operation avionics system of claim 15, wherein the user input components comprise:
(a) a plurality of line select keys, in which each line select key is disposed adjacent to a different graphical user interface; and
(b) a plurality of soft keys, wherein the processor is responsive to both the line select keys and the soft keys, the processor further programmed to: receive an input indicating that a selected one of the line select keys has been actuated and, in response to the input, associating at least a set of the soft keys with the avionics device corresponding to the activated line select key.

21. The universal management, control and operation avionics system of claim 20, wherein the processor is further programmed to display a plurality of labels, each label adjacent to a different one of the soft keys and each label indicating an action operation with a soft key that is specific to the selected avionics device and that will occur upon actuation of the soft key.

22. The universal management, control and operation avionics system of claim 20, wherein the processor is further programmed to execute an operation, upon receiving input that a selected one of the set of soft keys has been actuated, that is specific to the selected avionics device and that is associated with the selected one of the set of soft keys.

23. The universal management, control and operation avionics system of claim 15, wherein the processor is programmed by software, stored on a non-transitory computer-readable memory, comprising a plurality of layers, the plurality of layers including:
(a) a hardware protocol layer that implements hardware protocols for each data communications standard or protocol supported by the system and that includes a plurality of software modules that each correspond in a one-to-one relationship with a selected one of the avionics devices;
(b) a data protocol software layer that implements the data protocols for each data communications standard or protocol supported by the system and that includes a plurality of software modules that each correspond in a one-to-one relationship with a particular data protocol associated with a selected one of the avionics devices;
(c) a device interface software layer that implements an interface between the system and each type of avionics device and that includes a plurality of software modules that each generate commands and instructions for communication to a corresponding avionics system and that interpret data received from corresponding avionics system; and
(d) a user interface software layer that implements a system-wide user interface including, each of the graphical user interfaces displayed on display device and interaction with the user input components and that includes a module that generates the graphical user interfaces and that communicates inputs made by the user to the avionics devices.

* * * * *